United States Patent
Cheng et al.

(10) Patent No.: US 9,404,787 B2
(45) Date of Patent: Aug. 2, 2016

(54) LEVEL MEASURING DEVICE WITH AN INTEGRATABLE LENS ANTENNA

(71) Applicant: FINETEK CO., LTD., New Taipei (TW)

(72) Inventors: Shu-Chien Cheng, New Taipei (TW); Chien-Lung Huang, New Taipei (TW); Tzu-Chuan Tsai, New Taipei (TW); Yao-Chen Yu, New Taipei (TW); Ting-Kuo Wu, New Taipei (TW); Chao-Kai Cheng, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 355 days.

(21) Appl. No.: 14/191,410

(22) Filed: Feb. 26, 2014

(65) Prior Publication Data

US 2015/0241261 A1    Aug. 27, 2015

(51) Int. Cl.

| | |
|---|---|
| *G01S 13/88* | (2006.01) |
| *G01F 23/284* | (2006.01) |
| *G01S 7/40* | (2006.01) |
| *G01S 13/08* | (2006.01) |
| *H01Q 1/22* | (2006.01) |
| *H01Q 3/08* | (2006.01) |
| *H01Q 13/02* | (2006.01) |
| *H01Q 19/08* | (2006.01) |
| *G01S 7/02* | (2006.01) |

(52) U.S. Cl.
CPC .............. *G01F 23/284* (2013.01); *G01S 7/4026* (2013.01); *G01S 13/08* (2013.01); *G01S 13/88* (2013.01); *H01Q 1/225* (2013.01); *H01Q 3/08* (2013.01); *H01Q 13/02* (2013.01); *H01Q 19/08* (2013.01); *G01S 2007/027* (2013.01)

(58) Field of Classification Search
CPC ........ G01F 23/284; H01Q 1/225; H01Q 3/08; H01Q 13/02; H01Q 19/08; G01S 13/88
USPC .......................................................... 342/124
See application file for complete search history.

(56) References Cited

U.S. PATENT DOCUMENTS

| | | | | |
|---|---|---|---|---|
| 4,566,321 A * | 1/1986 | Zacchio | ................ | G01F 23/284 324/643 |
| 4,670,754 A * | 6/1987 | Zacchio | ................ | G01F 23/284 342/124 |
| 5,305,237 A * | 4/1994 | Dalrymple | ............ | G01F 23/284 324/644 |
| 6,779,397 B2 * | 8/2004 | Burger | .................. | G01F 23/284 340/612 |
| 6,834,546 B2 * | 12/2004 | Edvardsson | .......... | G01F 23/284 340/612 |
| 6,928,867 B2 * | 8/2005 | Reimelt | ................ | G01F 23/284 342/124 |
| 7,204,140 B2 * | 4/2007 | Kallsand | ............... | G01F 23/284 333/252 |

(Continued)

*Primary Examiner* — Peter Bythrow
(74) *Attorney, Agent, or Firm* — Pai Patent & Trademark Law Firm; Chao-Chang David Pai

(57) ABSTRACT

A level measuring device with an integratable lens has a radar level meter and an angle adjusting assembly. The radar level meter has a horn antenna and a lens antenna assembly mounted on a signal transceiving end of the radar level meter. The lens antenna assembly has a housing and a lens antenna. The housing is hollow and receives the horn antenna therein. One end of the housing is connected to the lens antenna, and the other end of the housing is connected to the signal transceiving end of the radar level meter. The angle adjustment assembly is mounted around the housing. As the lens antenna assembly covers the horn antenna, the horn antenna is less likely to be damaged. Additionally, the housing of the lens antenna assembly is connected with the angle adjusting assembly for angle adjustment of the combined horn antenna and lens antenna assembly.

12 Claims, 14 Drawing Sheets

(56) References Cited

U.S. PATENT DOCUMENTS

| | | | |
|---|---|---|---|
| 7,940,207 B1* | 5/2011 | Kienzle | G01F 23/284 342/124 |
| 2002/0126061 A1* | 9/2002 | Griessbaum | G01F 23/284 343/786 |
| 2003/0030517 A1* | 2/2003 | Munley | H01P 1/08 333/252 |
| 2003/0151560 A1* | 8/2003 | Kienzle | G01F 23/284 343/786 |
| 2006/0000274 A1* | 1/2006 | Kallsand | G01F 23/284 73/290 V |
| 2007/0115196 A1* | 5/2007 | Motzer | G01F 23/284 343/786 |
| 2009/0212996 A1* | 8/2009 | Chen | G01F 23/284 342/124 |
| 2010/0066594 A1* | 3/2010 | Kienzle | G01F 23/284 342/175 |
| 2010/0090883 A1* | 4/2010 | Chen | G01F 23/284 342/124 |
| 2012/0169527 A1* | 7/2012 | Edvardsson | G01F 23/284 342/124 |
| 2012/0206312 A1* | 8/2012 | Coupland | H01Q 19/08 343/786 |
| 2012/0262331 A1* | 10/2012 | Kienzle | B29C 45/2624 342/124 |
| 2013/0099989 A1* | 4/2013 | Pantea | G01F 23/284 343/783 |
| 2014/0047917 A1* | 2/2014 | Vogt | G01F 23/284 73/290 V |
| 2014/0085129 A1* | 3/2014 | Westerling | H01Q 9/28 342/124 |

\* cited by examiner

LEVEL MEASURING DEVICE WITH AN INTEGRATABLE LENS ANTENNA

BACKGROUND OF THE INVENTION

1. Field of the Invention

The present invention relates to a level measuring device, and more particularly to a level measuring device having a lens antenna and a horn antenna mounted inside the lens antenna to protect against damage arising from exposure to corrosive object to be measured and increase a bandwidth of a reflection coefficient.

2. Description of the Related Art

Currently, to measure a level of a material or a liquid, an ultrasonic level meter or a radar level meter is needed and is mounted on an inner wall of a container adjacent to a top edge of the container to measure a height of the material or the liquid, which is calculated by a time difference between the time when ultrasonic wave or radar wave is transmitted and the time when the ultrasonic wave or radar wave is received. As being generally more accurate than ultrasonic level meters for level measurement of material or liquid, the radar level meters have been gradually and extensively applied to all types of level measurement occasions.

The most common type of the radar level meter is frequency modulated continuous waves (FMCW) level meter calculating a distance between the radar level meter and an object to be measured with a time difference between a time upon transmitting electromagnetic wave and a time upon receiving the electromagnetic wave that is reflected by the object to be measured. In turn, a height or a level of the object to be measured can be calculated from the time difference.

With reference to FIG. 14, a conventional radar level meter 90 has a base 91, a horn antenna 92, multiple circuit boards 93, a signal transceiver 94 and a lens antenna 96. An upper portion of the base 91 is hollow. The horn antenna 92 is connected with a lower portion of the base 91. The circuit boards 93 are mounted inside the upper portion of the base 91. The signal transceiver 94 is mounted inside the lower portion of the base 91, is located above the horn antenna 92, is electrically connected to the circuit boards 93 through a coaxial cable 95, transmit signals out through the horn antenna 92, and receives reflected signals through the horn antenna 92, so as to enhance directivity and bandwidth of the signals. The lens antenna 96 is mounted on an opening of the horn antenna 92 to provide a sealing effect. Since the horn antenna 92 has better directivity, electromagnetic wave transceived by the conventional radar level meter 90 can be more concentrated and is advantageous in longer distance measurement. When the base 91 is mounted on an inner wall of a container, the horn antenna 92 and the lens antenna 96 are located inside the container and are subjected to the effect of the object to be measured, such as high temperature, high pressure or corrosion caused by acidic or alkaline matter due to the exposure to a liquid to be measured or gas evaporated from the liquid. Once the horn antenna 92 or the lens antenna 96 is damaged, the radar level meter 90 fails to do any level measurement.

The container is usually barrel-shaped or cylindrical. A top edge portion of the container is designed to be curved for higher pressure resistance. When the conventional radar level meter is mounted on the top edge portion, the horn antenna 92 and the lens antenna 96 are not perpendicular to the level of the object to be measured and there is a tilt angle existing between a common center line of the horn antenna 92 and the lens antenna 96 and a direction perpendicular to the level of the object to be measured. The actual level measurement is therefore inaccurate.

SUMMARY OF THE INVENTION

An objective of the present invention is to provide a level measuring device with an integratable lens antenna for protecting against damage arising from exposure to corrosive object to be measured and increasing a bandwidth of a reflection coefficient.

To achieve the foregoing objective, the level measuring device with an integratable lens antenna has a radar level meter and an angle adjusting assembly.

The radar level meter has a signal transceiving end, a horn antenna and a lens antenna assembly.

The horn antenna is mounted on the signal transceiving end.

The lens antenna assembly is mounted around the horn antenna and has a housing and a lens antenna.

The housing is hollow, receives the horn antenna therein, and has two ends, a recess and a coupling portion.

The recess is formed in one of the ends of the housing with an inner wall thereof engaging the signal transceiving end.

The coupling portion is formed on a periphery of the housing.

The lens antenna is formed on the other end of the housing.

The angle adjusting assembly is connected with the coupling portion of the housing of the lens antenna assembly.

As the housing and the lens antenna of the lens antenna assembly fully cover the horn antenna, damage to the horn antenna due to exposure to high-temperature, high-pressure or corrosive environment can be prevented. Moreover, because the housing of the lens antenna assembly is connected with the angle adjusting assembly, when the angle adjusting assembly is mounted on a container containing an object to be measured, a directing angle of the signal transceiving end, the horn antenna and the lens antenna assembly of the radar level meter can be adjusted through the angle adjusting assembly. Accordingly, the issues of conventional radar level meters being prone to damage and inflexible in detection angle adjustment can be resolved.

Other objectives, advantages and novel features of the invention will become more apparent from the following detailed description when taken in conjunction with the accompanying drawings.

DETAILED DESCRIPTION OF THE INVENTION

Figure 1:
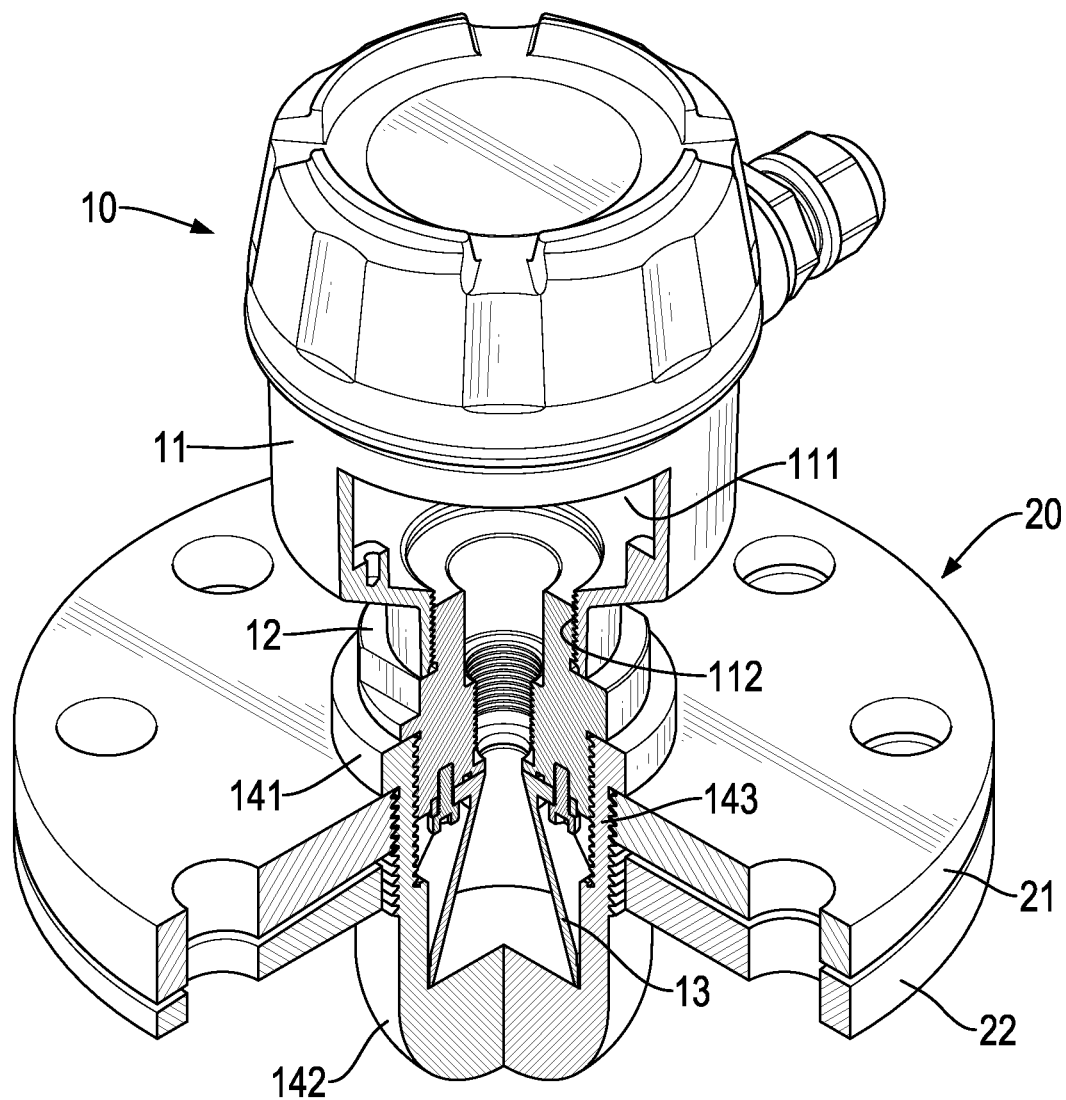
FIG. 1 is a perspective view in partial section of a first embodiment of a level measuring device in accordance with the present invention.
Figure 2:
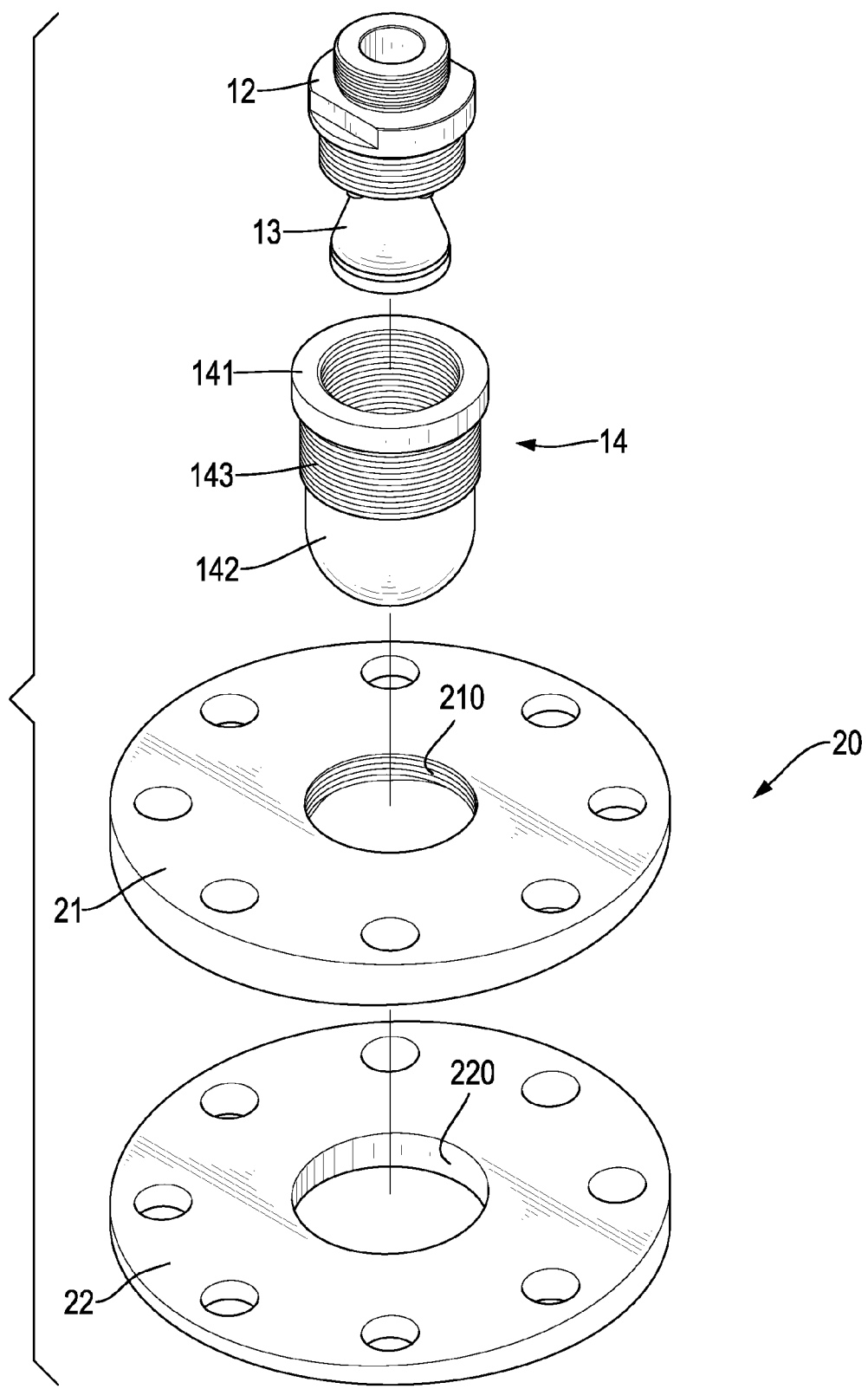
FIG. 2 is a partially exploded perspective view of the level measuring device in FIG. 1.

With reference to FIGS. 1 and 2, a first embodiment of a level measuring device in accordance with the present invention has a radar level meter 10 and an angle adjusting assembly 20.

The radar level meter 10 has a base 11, a connector 12, a horn antenna 13 and a lens antenna assembly 14. The base 11 has a top end and a bottom end. The top end of the base 11 is hollow and has a chamber 111 defined therein for receiving multiple circuit boards. The bottom end has a connecting portion 112 formed thereon. The connector 12 is tubular. One end of the connector 12 is connected with the connecting portion 112 of the bottom end of the base 11, the other end of the connector 12 has a signal transceiver mounted therein and connected to the circuit boards for signal transceiving. The end of the connector 12 with the signal transceiver is connected with the funnel-shaped horn antenna 13. The lens antenna assembly 14 has a housing 141 and a lens antenna 142. The housing 141 is hollow for receiving the horn antenna 13 therein. The lens antenna 142 is formed on one end of the housing 141, and a recess is formed in the other end of the housing 141 with an inner wall engaging the end of the connector 12 that is connected with the horn antenna 13. The housing 141 further has a coupling portion 143 being externally threaded on a periphery of the housing 141.

The angle adjusting assembly 20 has a top overlapping flange 21 and a bottom overlapping flange 22. The top overlapping flange 21 is overlapped on a top of the bottom overlapping flange 22. The top overlapping flange 21 and the bottom overlapping flange 22 are disk-shaped with a tapered thickness formed between a thick edge and a thin edge of each of the top overlapping flange 21 and the bottom overlapping flange 22. The top overlapping flange 21 has a fixing hole 210 centrally formed through the top overlapping flange 21 and being internally threaded to engage the coupling portion 143 of the housing 141 of the lens antenna assembly 14. The bottom overlapping flange 22 has a through hole 220 centrally formed through the bottom overlapping flange 22 and penetrated through by the lens antenna 142. The top overlapping flange 21 and the bottom overlapping flange 22 are rotated with respect to each other for the lens antenna 142 to be directed at a selected angle.

Figure 3:
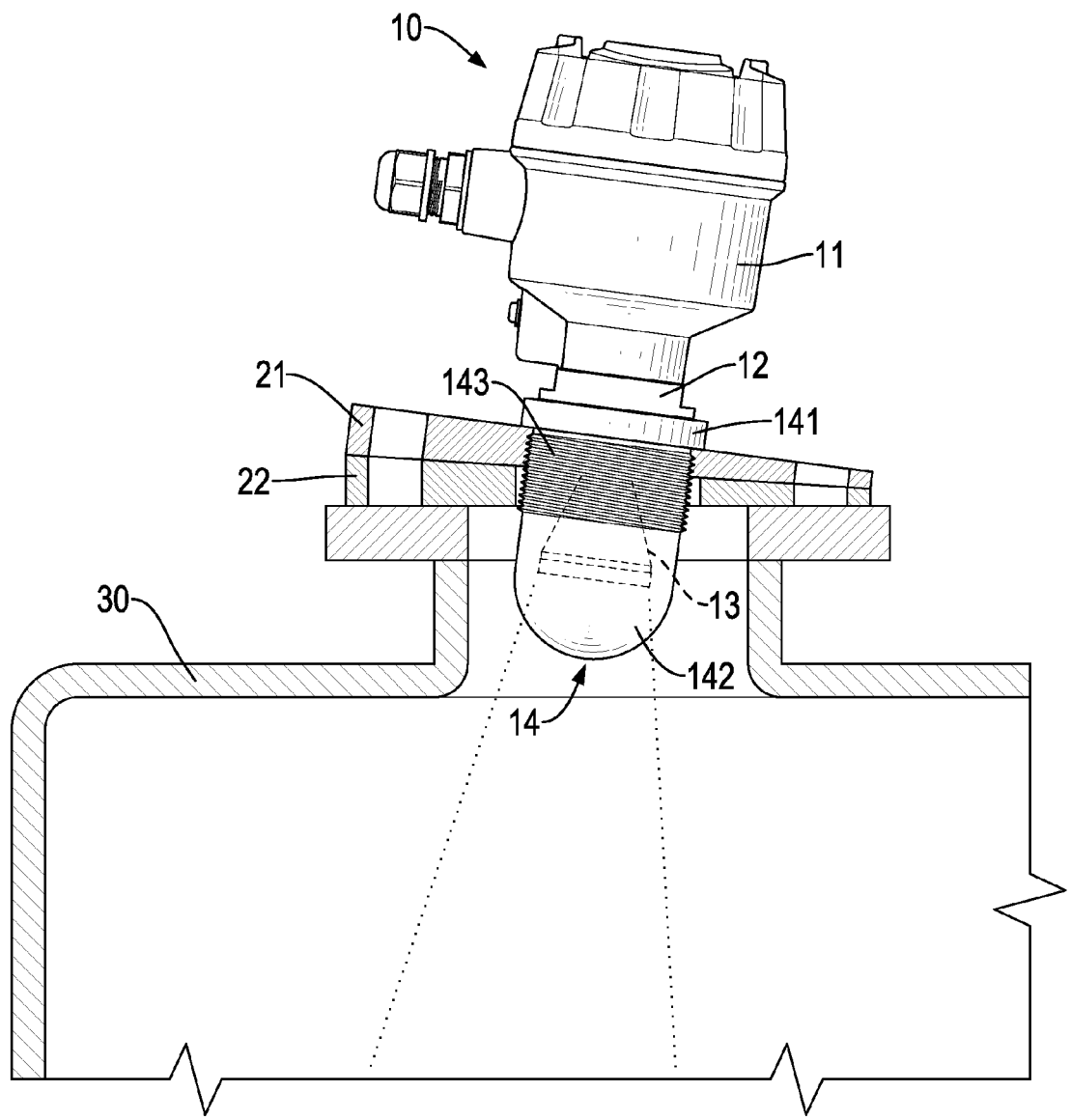
FIG. 3 is an operational side view of the level measuring device in FIG. 1.
Figure 4:
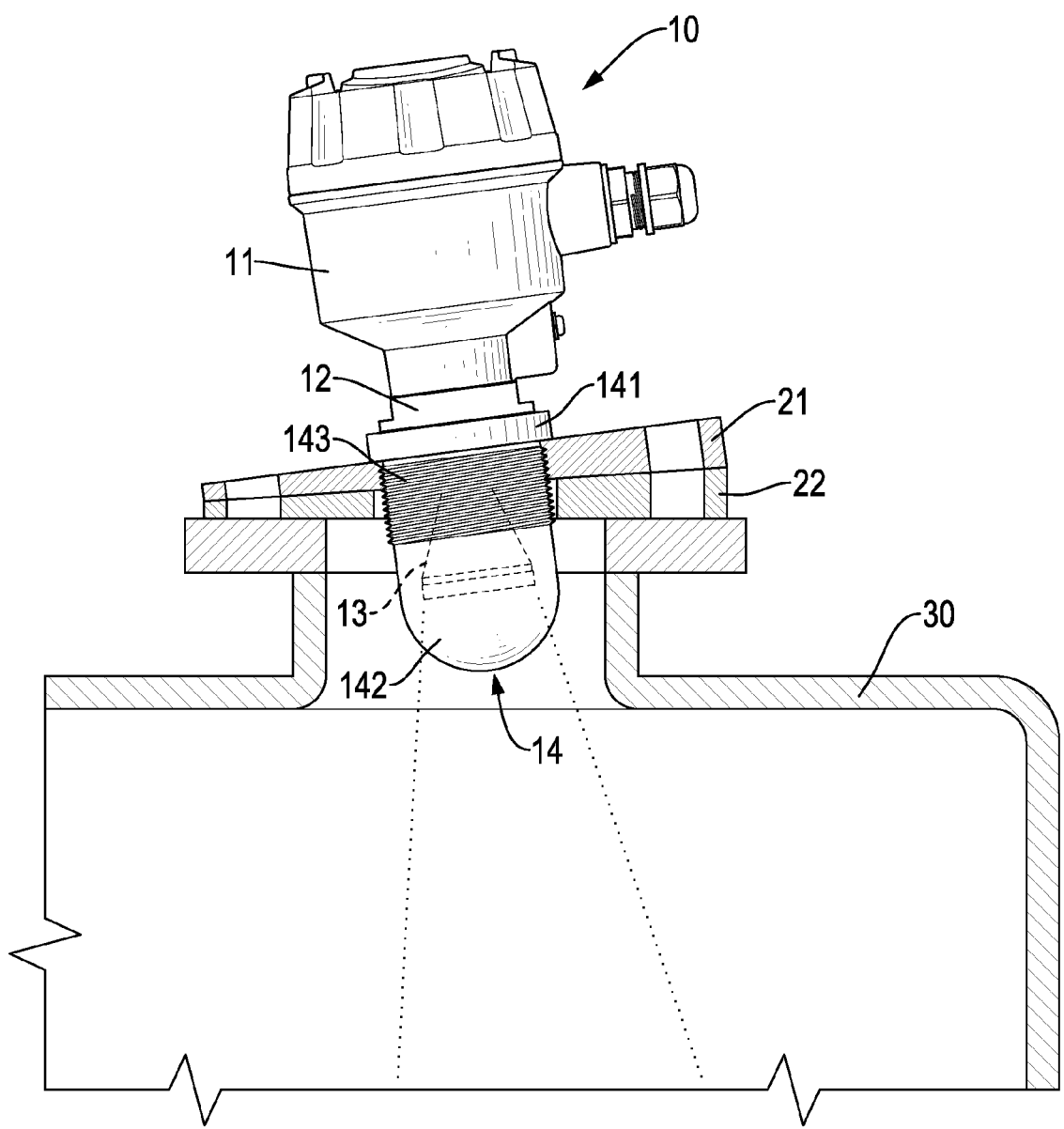
FIG. 4 is another operational side view of the level measuring device in FIG. 1.

When the level measuring device is mounted on a top end of a container 30, the bottom overlapping flange 22 is connected with the top end of the container 30. When the top overlapping flange 21 and the bottom overlapping flange 22 are rotated with respect to each other with thick ends of the top overlapping flange 21 and the bottom overlapping flange 22 located oppositely, the horn antenna 13 and the lens antenna assembly 14 are directed straight down. When the top overlapping flange 21 and the bottom overlapping flange 22 are rotated with the thick ends of the top overlapping flange 21 and the bottom overlapping flange 22 located on the same side, the horn antenna 13 and the lens antenna assembly 14 are directed down to the left as shown in FIG. 3 or directed down to the right as shown in FIG. 4 to transmit and receive signals for detecting different areas or compensating a tilt angle generated when the level measuring device is obliquely mounted on the container 30.

Figure 5:
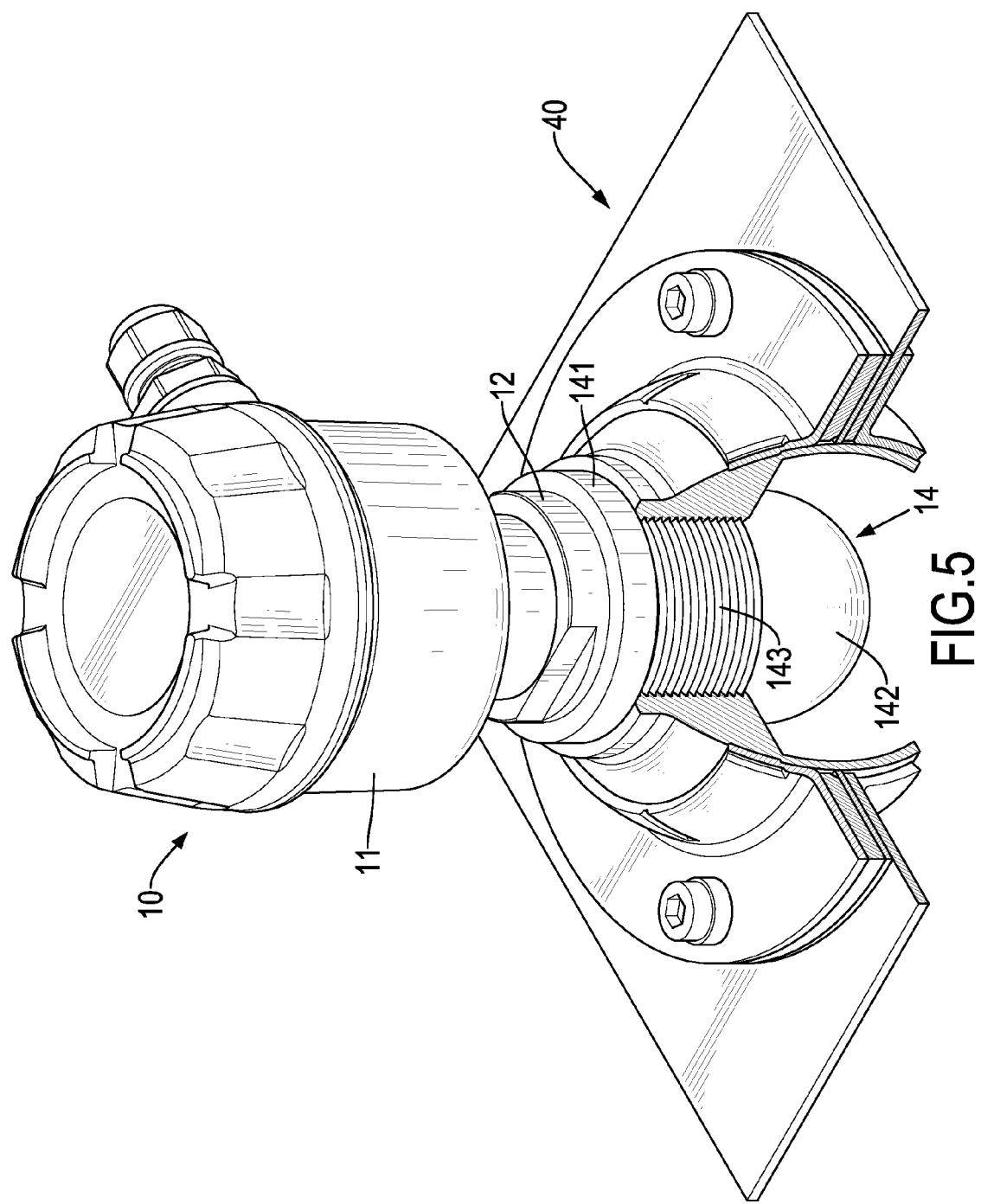
FIG. 5 is a perspective view in partial section of a second embodiment of a level measuring device in accordance with the present invention.
Figure 6:
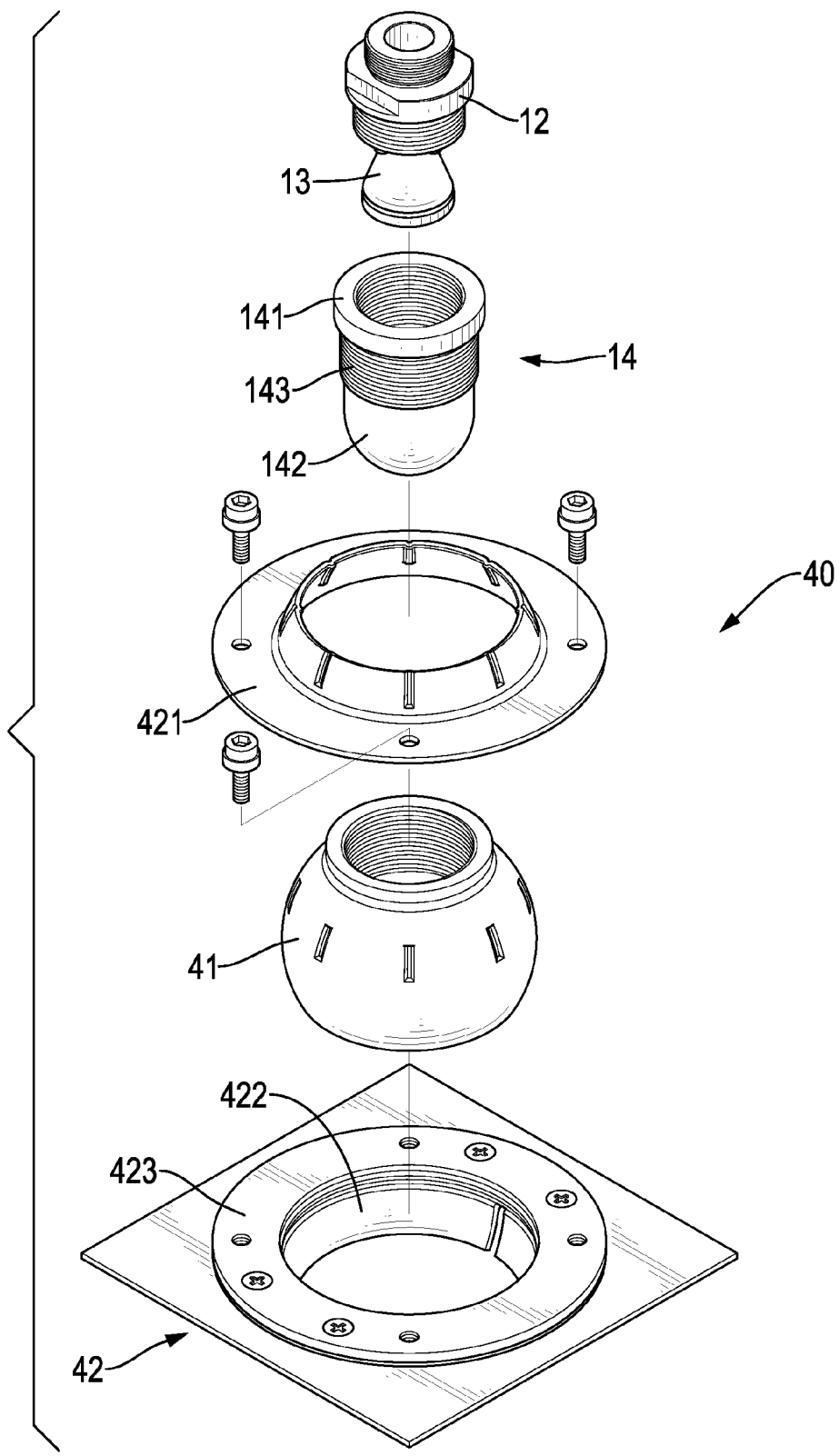
FIG. 6 is a partially exploded perspective view of the level measuring device in FIG. 5.

With reference to FIGS. 5 and 6, a second embodiment of a level measuring device in accordance with the present invention differs from the foregoing embodiment in having a different angle adjusting assembly 40. The angle adjusting assembly 40 is connected with the radar level meter 10, and has a rotatable joint 41 and a fixed joint holder 42. The rotatable joint 41 is spherical and hollow with a top open end and a bottom open end respectively on a top and a bottom, and is rotatably mounted in and held by the fixed joint holder 42. The top open end is internally threaded to engage the externally-threaded coupling portion 143 of the housing 141 of the lens antenna assembly 14. The lens antenna assembly 14 penetrates through and protrudes beyond the bottom open end. The fixed joint holder 42 has a support ring 423, a bottom fixed support member 422 and a top fixed support member 421. The top fixed support member 421 and the bottom fixed support member 422 are funnel-shaped. The top fixed support member 421 takes the form of an inverted funnel. The support ring 423 is mounted on the bottom fixed support member 422 with a through hole of the support ring 423 corresponding to an upper opening of the bottom fixed support member 422. The rotatable joint 41 is rotatably mounted in the bottom fixed support member 422. The top fixed support member 421 is then mounted on the bottom fixed support member 422 with a lower opening of the top fixed support member 421 corresponding to the upper opening of the bottom fixed support member 422 so that the rotatable joint 41 is rotatably held between the bottom fixed support member 422 and the top fixed support member 421.

Figure 7:
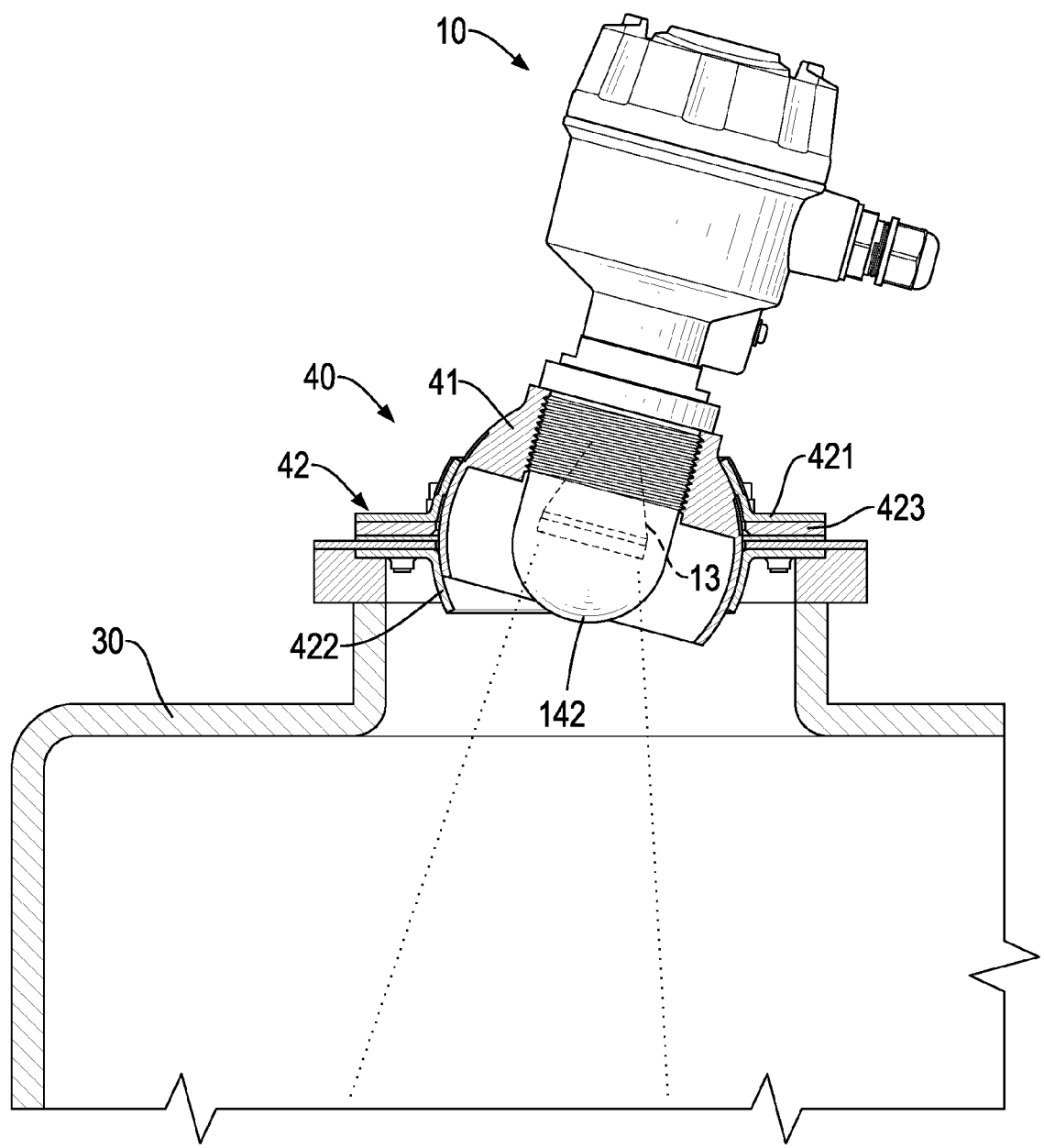
FIG. 7 is an operational side view of the level measuring device in FIG. 5.
Figure 8:
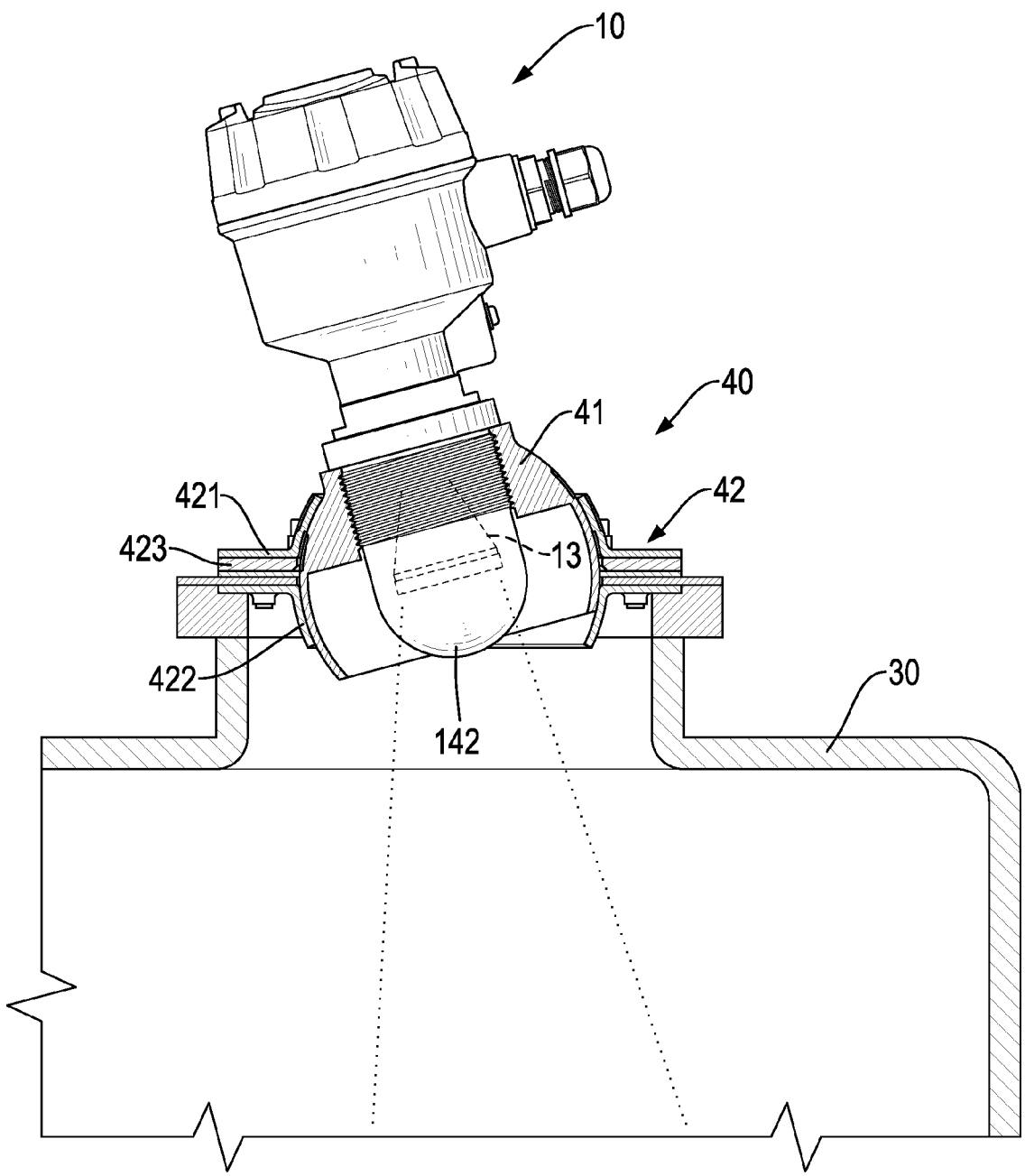
FIG. 8 is another operational side view of the level measuring device in FIG. 5.

When the level measuring device is mounted on the top end of the container 30, the fixed joint holder 42 is connected with the container 30 and the rotatable joint 41 is rotatably adjusted for the horn antenna 13 and the lens antenna 142 to be directed down to the left as shown in FIG. 7 or directed down to the right as shown in FIG. 8 for detecting different areas or compensating a tilt angle generated when the level measuring device is obliquely mounted on the container 30.

Figure 9:
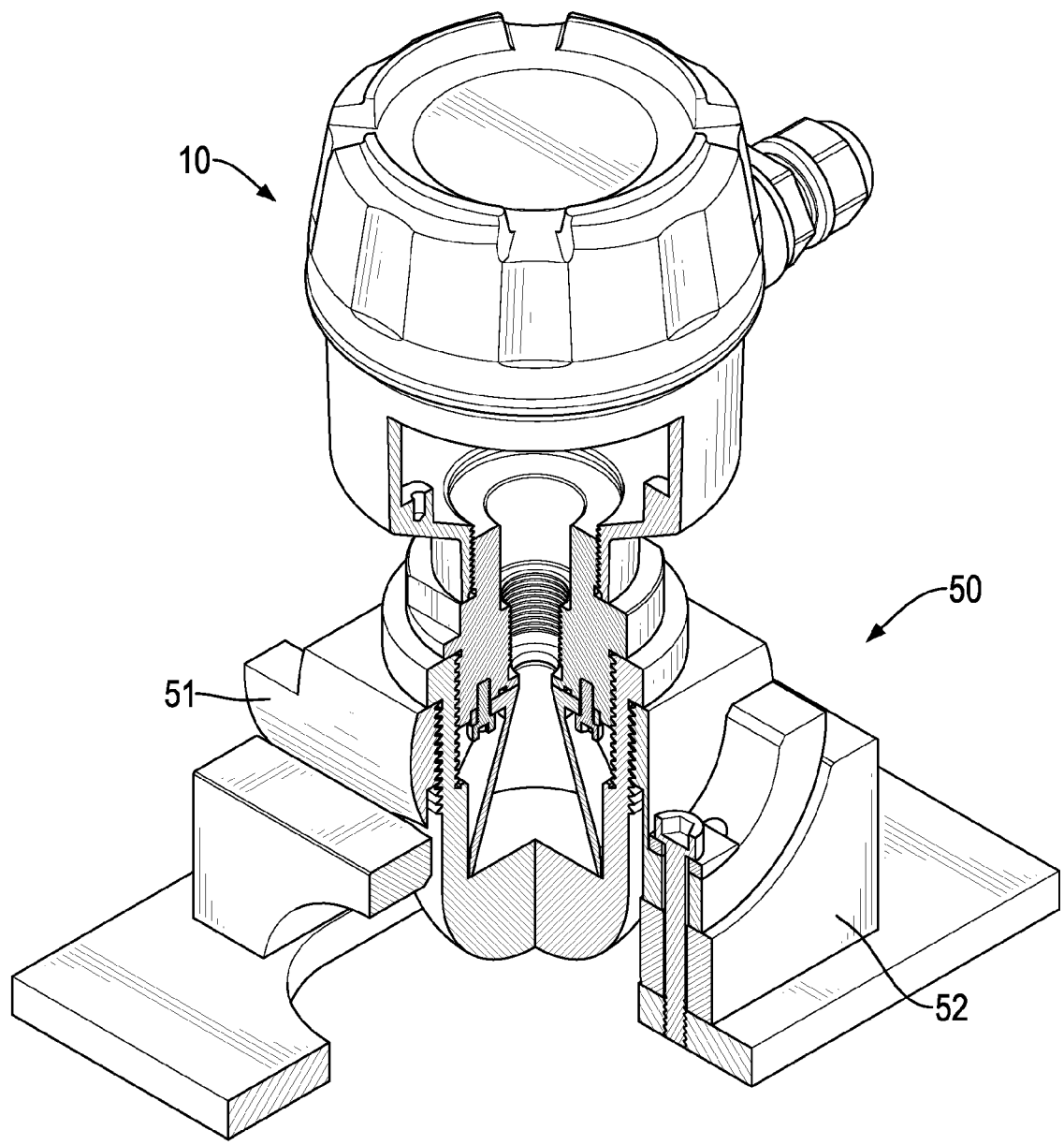
FIG. 9 is a perspective view in partial section of a third embodiment of a level measuring device in accordance with the present invention.
Figure 10:
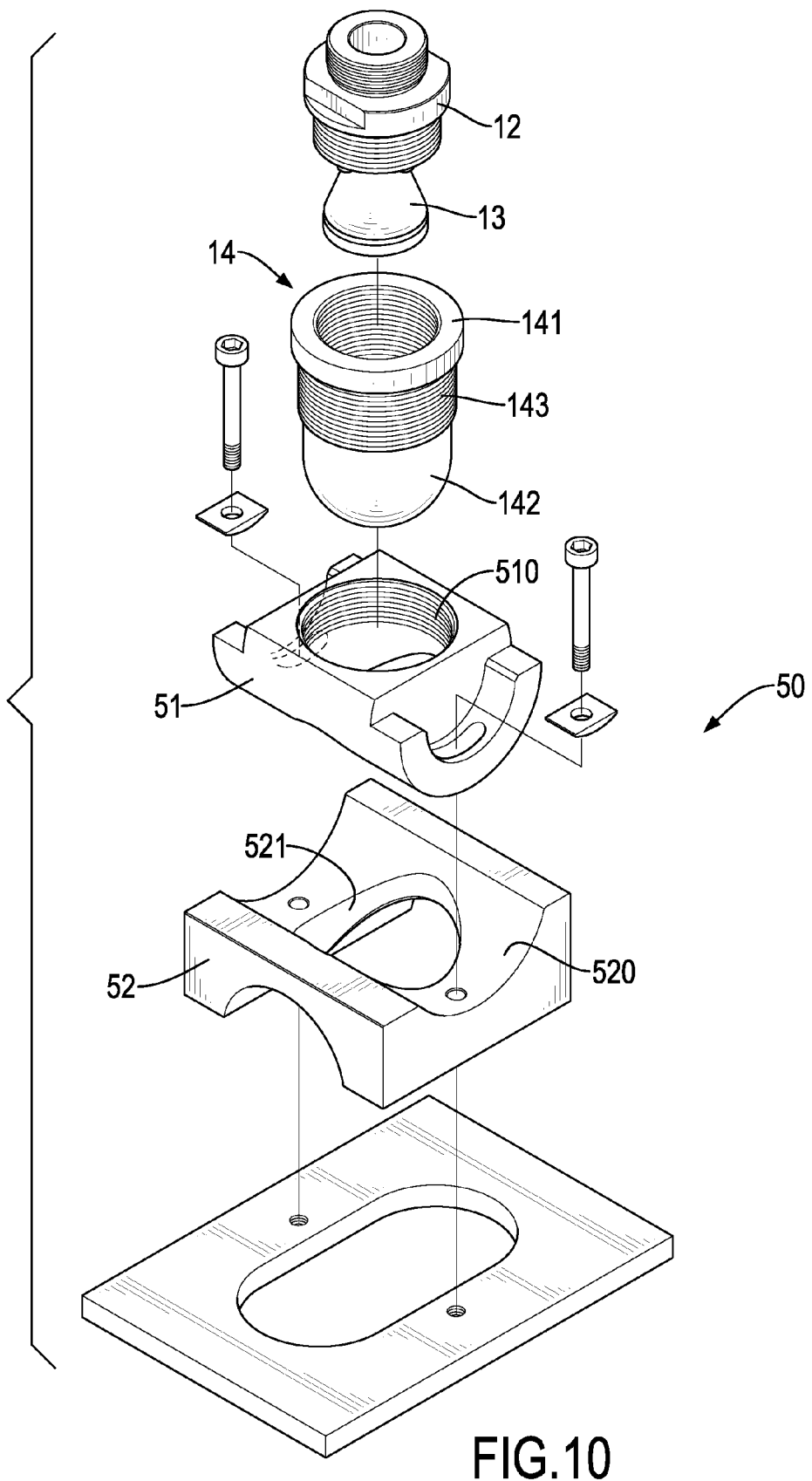
FIG. 10 is a partially exploded perspective view of the level measuring device in FIG. 9.

With reference to FIGS. 9 and 10, a third embodiment of a level measuring device in accordance with the present invention differs from the foregoing embodiments in having a different angle adjusting assembly 50. The angle adjusting assembly 50 is connected with the radar level meter 10, and has a slidable mounting seat 51 and a fixed seat holder 52. The slidable mounting seat 51 has a fixing hole 510 centrally formed through the slidable mounting seat 51, being internally threaded, and engaging the externally-threaded coupling portion 143 of the housing 141 of the lens antenna assembly 14. The slidable mounting seat 51 has an arc-shaped bottom surface. The fixed seat holder 52 has an arc-shaped recess 520 and a through hole 521. The arc-shaped recess 520 is formed in a top of the fixed seat holder 52 and corresponds to the arc-shaped bottom surface of the slidable mounting seat 51 for the slidable mounting seat 51 to be slidably moved on the arc-shaped recess 520 for angle adjustment. The through hole 521 is centrally formed through the fixed seat holder 52.

Figure 11:
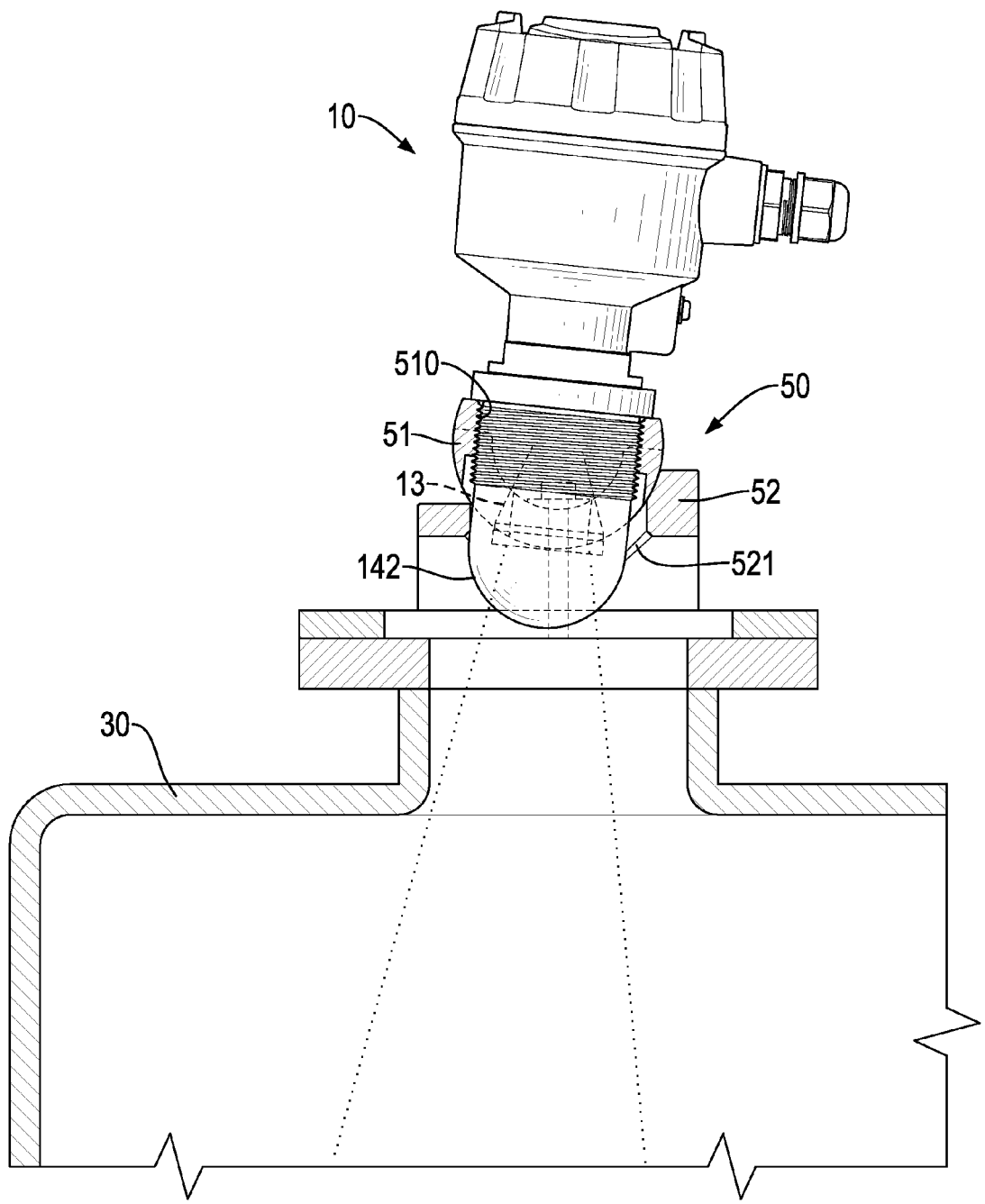
FIG. 11 is an operational side view of the level measuring device in FIG. 9.
Figure 12:
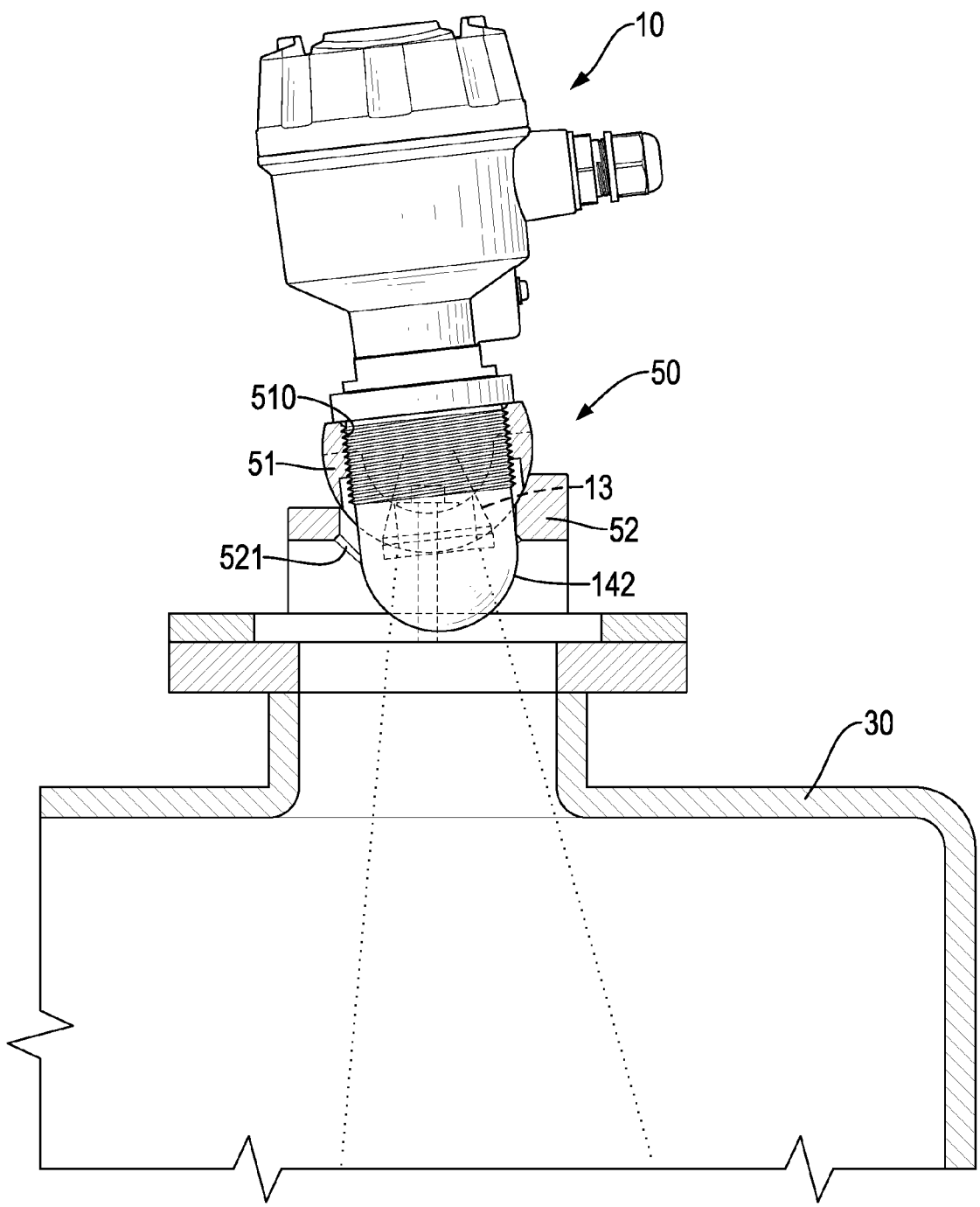
FIG. 12 is another operational side view of the level measuring device in FIG. 9.

When the level measuring device is mounted on the top end of the container 30, the fixed seat holder 52 is connected with the container 30 and the slidable mounting seat 51 is slidably moved on the arc-shaped recess 520 for the horn antenna 13 and the lens antenna 142 to be directed down to the left as shown in FIG. 11 or directed down to the right as shown in FIG. 12 for detecting different areas or compensating a tilt angle generated when the level measuring device is obliquely mounted on the container 30.

Figure 13:
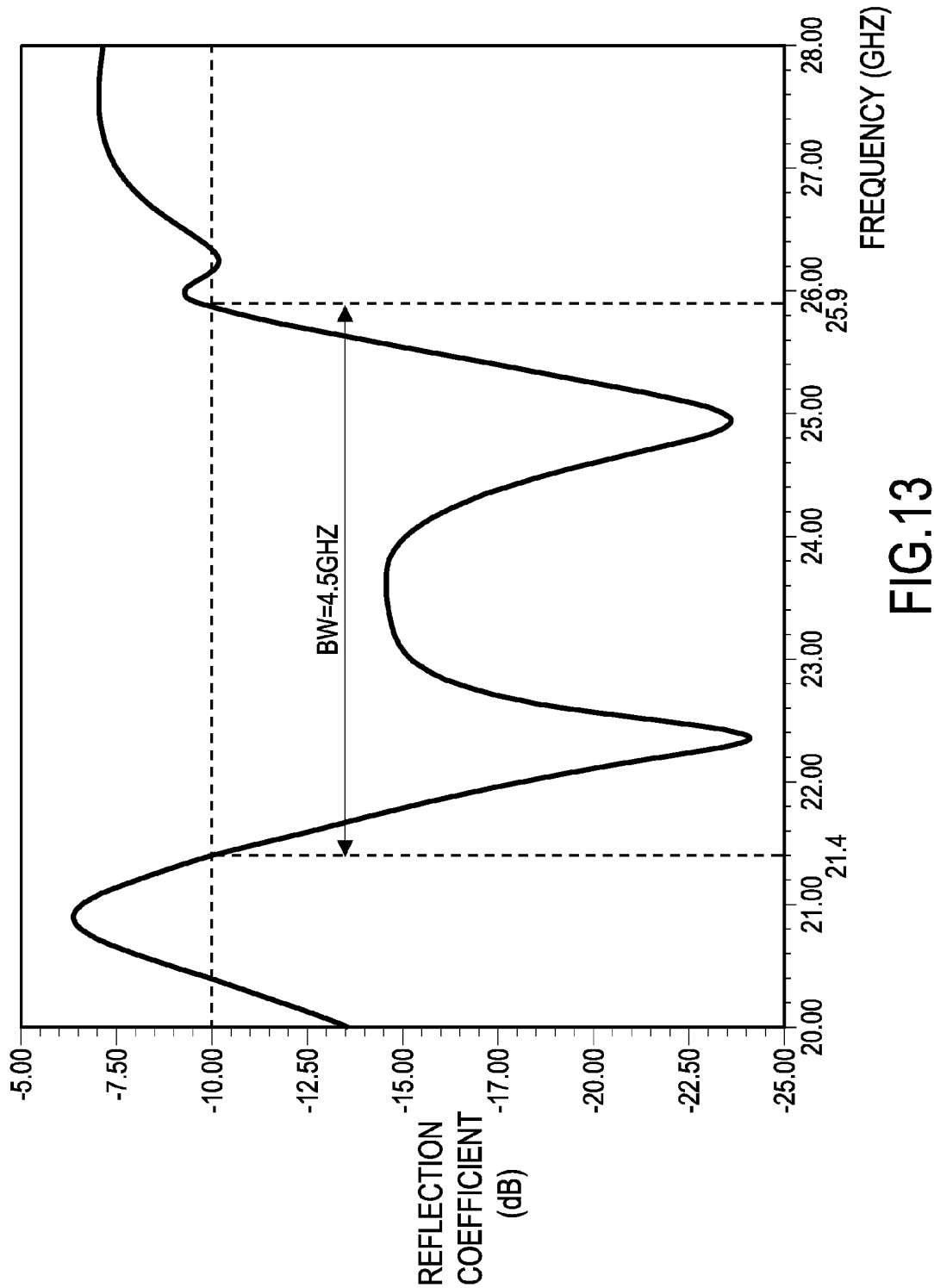
FIG. 13 is a chart showing reflection coefficient of a combined antenna of a lens antenna assembly and a horn antenna in FIG. 1.
Figure 14:
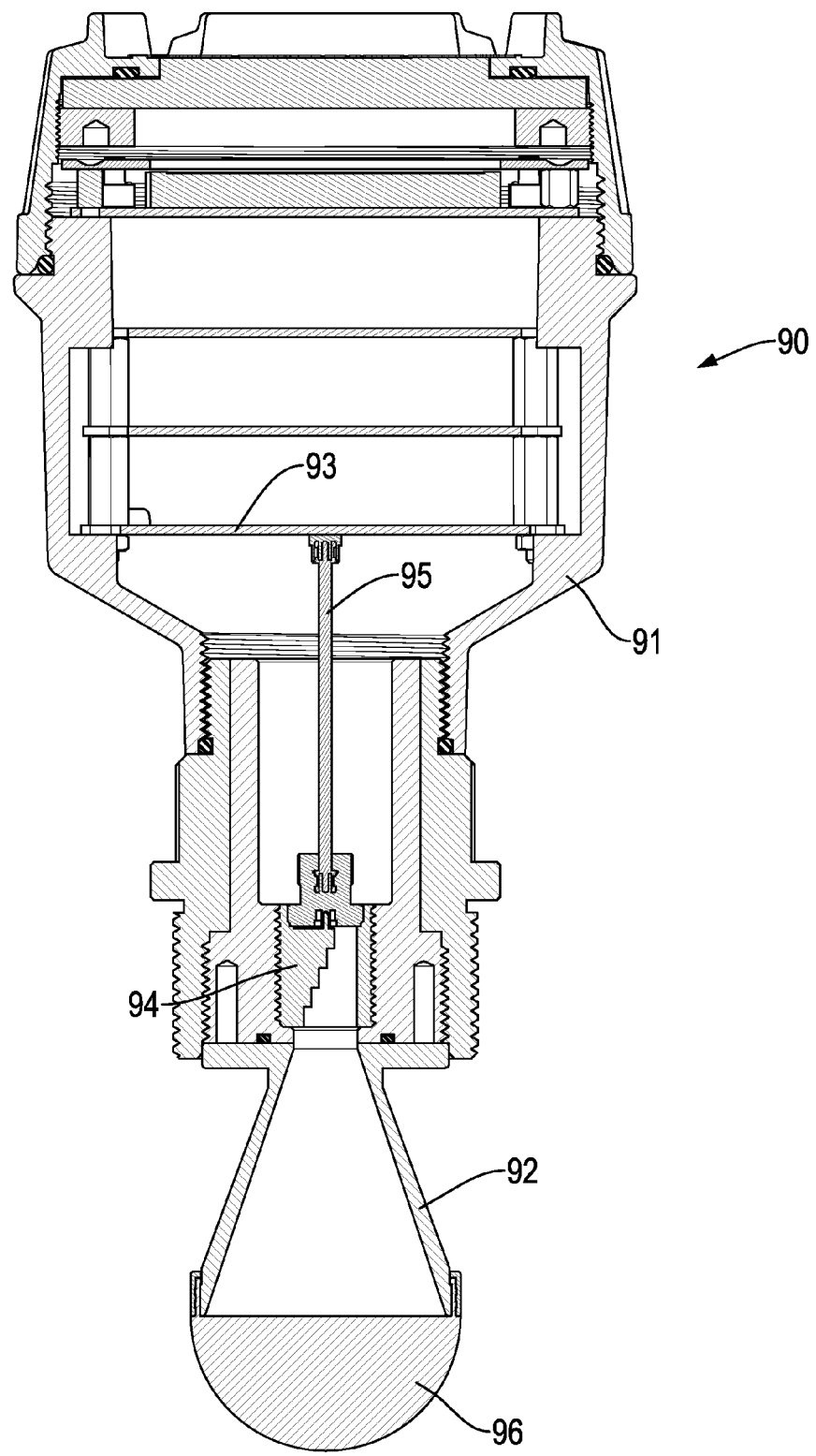
FIG. 14 is a cross-sectional view of a conventional radar level meter.

The horn antenna 13 is mounted inside the lens antenna assembly 14 in the present invention. A graph of a reflection coefficient of the combined horn antenna 13 and the lens antenna assembly 14 is shown in FIG. 13. The combined horn antenna 13 and the lens antenna assembly 14 can be applied to 24.0 GHz band because the reflection coefficient within a range of 24.0 GHz~24.512 GHz is considerably below −10 dB. The bandwidth of the reflection coefficient at −10 dB reaches 4.5 GHz (25.9 GHz-21.4 GHz), which is significantly higher than that used in conventional radar level meters and can be adapted to various strict environments, such as high-temperature, high-pressure, corrosive environment and the like.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A level measuring device with an integratable lens antenna, comprising:
    a radar level meter having:
        a signal transceiving end;
        a horn antenna mounted on the signal transceiving end; and
        a lens antenna assembly mounted around the horn antenna and having:
            a housing being hollow, receiving the horn antenna therein, and having:
                two ends;
                a recess formed in one of the ends of the housing with an inner wall thereof engaging the signal transceiving end; and
                a coupling portion formed on a periphery of the housing; and
            a lens antenna formed on the other end of the housing; and
        an angle adjusting assembly connected with the coupling portion of the housing of the lens antenna assembly.

2. The level measuring device as claimed in claim 1, wherein the radar level meter further has:
    a base having:
        a top end being hollow and having a chamber defined therein for receiving multiple circuit boards; and
        a bottom end having a connecting portion formed thereon; and
    a connector being tubular and having two ends, wherein one of the ends of the connector is connected with the connecting portion of the bottom end of the base and the other end of the connector is the signal transceiving end connected with the horn antenna and the housing of the lens antenna assembly.

3. The level measuring device as claimed in claim 1, wherein
    the coupling portion of the housing of the lens antenna assembly is externally threaded; and
    the angle adjusting assembly has:
        a bottom overlapping flange having a through hole centrally formed through the bottom overlapping flange and penetrated through by the lens antenna; and
        a top overlapping flange overlapped on a top of the bottom overlapping flange, and having a fixing hole centrally formed through the top overlapping flange and being internally threaded to engage the externally-threaded coupling portion.

4. The level measuring device as claimed in claim 2, wherein
    the coupling portion of the housing of the lens antenna assembly is externally threaded; and
    the angle adjusting assembly has:
        a bottom overlapping flange having a through hole centrally formed through the bottom overlapping flange and penetrated through by the lens antenna; and
        a top overlapping flange overlapped on a top of the bottom overlapping flange, and having a fixing hole centrally formed through the top overlapping flange and being internally threaded to engage the externally-threaded coupling portion.

5. The level measuring device as claimed in claim 3, wherein each of the top overlapping flange and the bottom overlapping flange has a tapered thickness formed between a thick edge and a thin edge of each of the top overlapping flange and the bottom overlapping flange, and the top overlapping flange and the bottom overlapping flange are rotated with respect to each other for the lens antenna to be directed at a selected angle.

6. The level measuring device as claimed in claim 4, wherein each of the top overlapping flange and the bottom overlapping flange has a tapered thickness formed between a thick edge and a thin edge of each of the top overlapping flange and the bottom overlapping flange, and the top overlapping flange and the bottom overlapping flange are rotated with respect to each other for the lens antenna to be directed at a selected angle.

7. The level measuring device as claimed in claim 1, wherein the angle adjusting assembly has:
    a fixed joint holder; and
    a rotatable joint being spherical and hollow, rotatably mounted in and held by the fixed joint holder, and having:
        a top open end internally threaded to engage the externally-threaded coupling portion of the housing of the lens antenna assembly; and
        a bottom open end, wherein the lens antenna assembly penetrates through and protrudes beyond the top open end.

8. The level measuring device as claimed in claim 2, wherein the angle adjusting assembly has:
    a fixed joint holder; and
    a rotatable joint being spherical and hollow, rotatably mounted in and held by the fixed joint holder, and having:
        a top open end internally threaded to engage the externally-threaded coupling portion of the housing of the lens antenna assembly; and
        a bottom open end, wherein the lens antenna assembly penetrates through and protrudes beyond the top open end.

9. The level measuring device as claimed in claim 7, wherein the fixed joint holder has:
    a bottom fixed support member taking the form of a funnel having an upper opening;

a top fixed support member taking the form of an inverted funnel, mounted on the bottom fixed support member, and having a lower opening corresponding to the upper opening of the bottom fixed support member; and a support ring mounted on the bottom fixed support member and having a through hole corresponding to the upper opening of the bottom fixed support member;

wherein the rotatable joint is rotatably held between the bottom fixed support member and the top fixed support member.

10. The level measuring device as claimed in claim 8, wherein the fixed joint holder has:

a bottom fixed support member taking the form of a funnel having an upper opening;

a top fixed support member taking the form of an inverted funnel, mounted on the bottom fixed support member, and having a lower opening corresponding to the upper opening of the bottom fixed support member; and a support ring mounted on the bottom fixed support member and having a through hole corresponding to the upper opening of the bottom fixed support member;

wherein the rotatable joint is rotatably held between the bottom fixed support member and the top fixed support member.

11. The level measuring device as claimed in claim 1, wherein the angle adjusting assembly has:

a slidable mounting seat having:
a fixing hole centrally formed through the slidable mounting seat, being internally threaded, and engaging the externally-threaded coupling portion of the housing of the lens antenna assembly; and
an arc-shaped bottom surface; and a fixed seat holder having:
an arc-shaped recess formed in a top of the fixed seat holder and corresponding to the arc-shaped bottom surface of the slidable mounting seat for the slidable mounting seat to be slidably moved on the arc-shaped recess for angle adjustment; and
a through hole centrally formed through the fixed seat holder.

12. The level measuring device as claimed in claim 2, wherein the angle adjusting assembly has:

a slidable mounting seat having:
a fixing hole centrally formed through the slidable mounting seat, being internally threaded, and engaging the externally-threaded coupling portion of the housing of the lens antenna assembly; and
an arc-shaped bottom surface; and a fixed seat holder having:
an arc-shaped recess formed in a top of the fixed seat holder and corresponding to the arc-shaped bottom surface of the slidable mounting seat for the slidable mounting seat to be slidably moved on the arc-shaped recess for angle adjustment; and
a through hole centrally formed through the fixed seat holder.

\* \* \* \* \*